United States Patent [19]

Nied et al.

[11] Patent Number: 4,838,974
[45] Date of Patent: Jun. 13, 1989

[54] METHOD OF FORMING MULTILAYER COMPOSITE PANELS WITH SPECULAR SURFACE

[75] Inventors: Herman F. Nied, Clifton Park; Louis P. Inzinna, Scotia, both of N.Y.

[73] Assignee: General Electric Company, Schenectady, N.Y.

[21] Appl. No.: 177,711

[22] Filed: Apr. 5, 1988

Related U.S. Application Data

[63] Continuation of Ser. No. 940,452, Dec. 10, 1986, abandoned.

[51] Int. Cl.⁴ .................. B29C 65/02; B32B 27/00; B32B 31/20
[52] U.S. Cl. .................. 156/222; 156/273.3; 156/309.9; 156/322; 156/324.4; 264/1.9; 264/25; 264/248; 264/257; 264/295; 264/322; 264/339
[58] Field of Search .............. 264/1.7, 1.9, 25, 248, 264/257, 294, 295, 320, 322, 339; 425/174.4, 374; 156/196, 222, 273.3, 292, 308.2, 309.9, 313, 322, 324.4, 443; 428/412

[56] References Cited

U.S. PATENT DOCUMENTS

| | | | |
|---|---|---|---|
| 2,373,035 | 4/1945 | Land | 264/1.3 X |
| 3,761,334 | 9/1973 | Jondek | 156/196 X |
| 3,997,386 | 12/1976 | Oshida et al. | 156/309.9 |
| 4,078,959 | 3/1978 | Palfey et al. | 156/222 X |
| 4,199,389 | 4/1980 | Palfey et al. | 156/196 |
| 4,201,612 | 5/1980 | Figge et al. | 264/247 X |
| 4,384,016 | 5/1983 | Ide et al. | 156/308.2 X |

FOREIGN PATENT DOCUMENTS

| | | | |
|---|---|---|---|
| 159106 | 1/1952 | Australia | 156/222 |
| 56-144938 | 11/1981 | Japan | 264/1.9 |
| 57-59721 | 4/1982 | Japan | 156/222 |
| 59-76255 | 5/1984 | Japan | 156/308.2 |

OTHER PUBLICATIONS

Page, S. L. "Polycarbonate", In: Modern Plastics Encyclopedia 1982–1983 (New York, McGraw-Hill, 1982), p. 60.

Primary Examiner—Jeffery Thurlow
Assistant Examiner—Leo B. Tentoni
Attorney, Agent, or Firm—William H. Steinberg; James C. Davis, Jr.; Paul R. Webb, II

[57] ABSTRACT

Thermoplastic panels are formed and laminated together simultaneously by using a roller to provide vertical pressure to two heated thermoplastic sheets, one a composite thermoplastic sheet, the other a monolithic thermoplastic sheet. The monolithic thermoplastic sheet allows laminating protective layers to structural panels for improving scratch resistance, improving appearance or reducing chemical permeability.

9 Claims, 2 Drawing Sheets

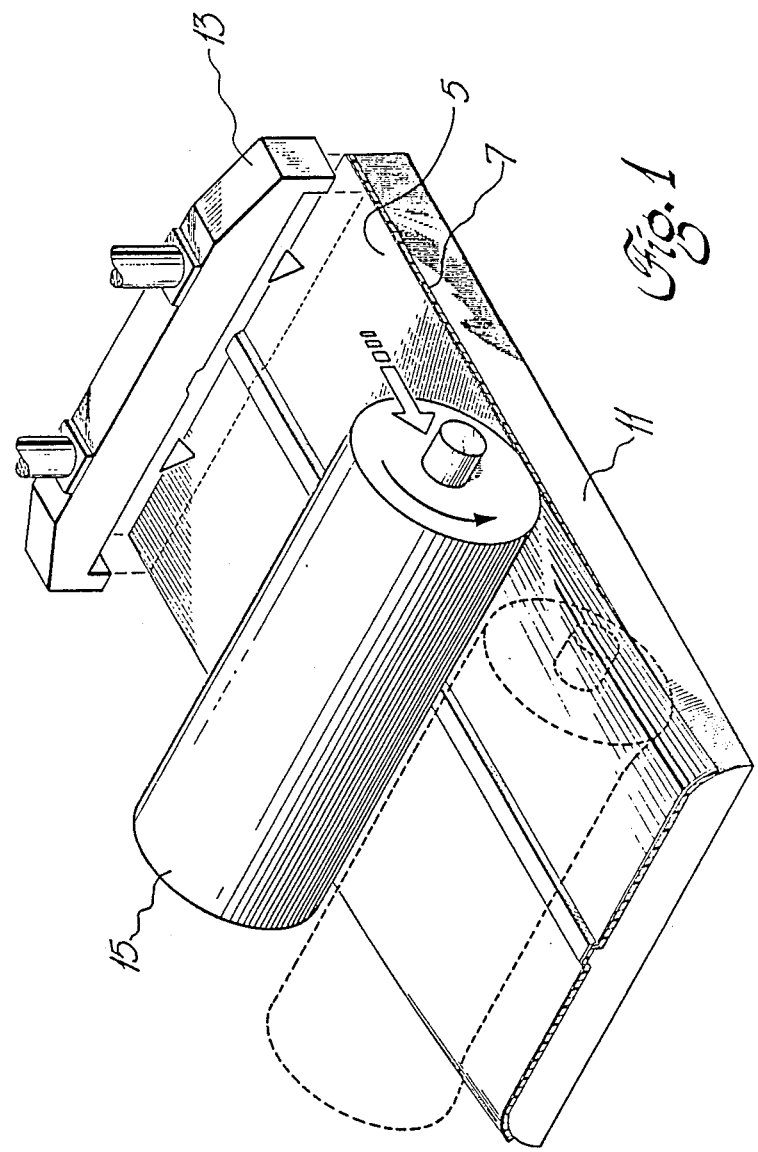

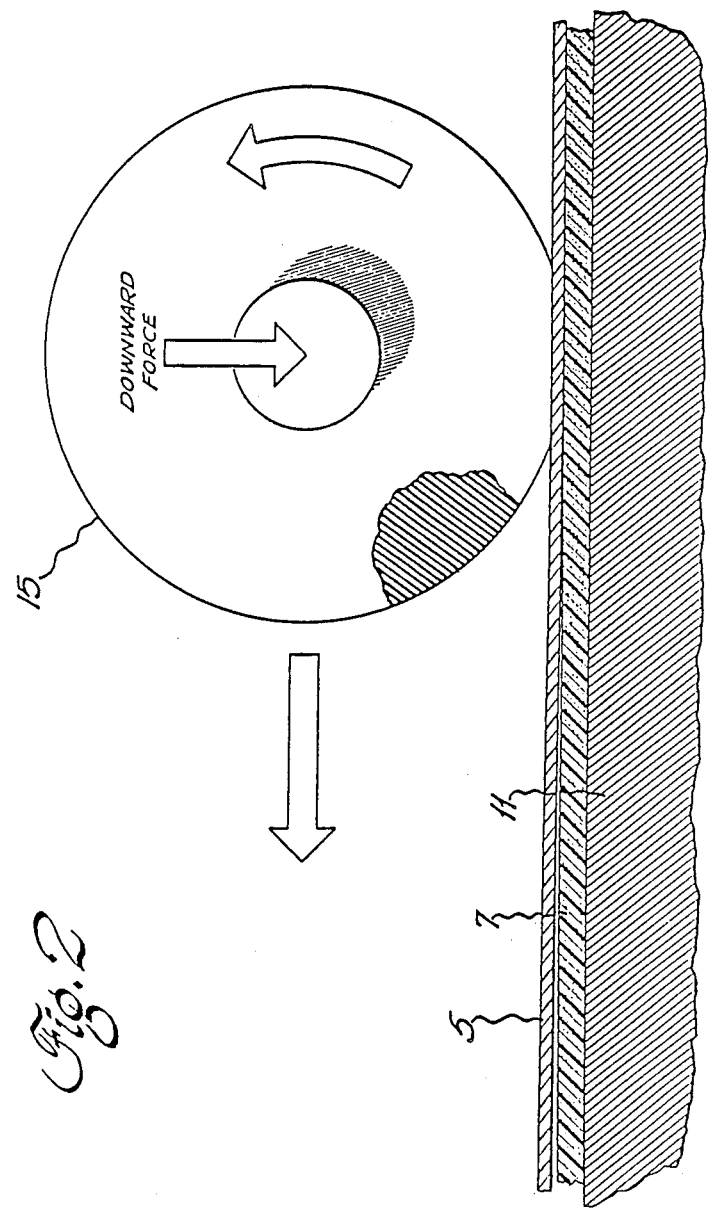

METHOD OF FORMING MULTILAYER COMPOSITE PANELS WITH SPECULAR SURFACE

This application is a continuation of application Ser. No. 940,452, filed 12/10/86, now abandoned.

CROSS REFERENCE TO RELATED APPLICATION

The present application is related to my copending application "Roller Forming of Thermoplastic Sheet Material" Ser. No. 843,343, hereby incorporated by reference.

BACKGROUND OF THE INVENTION

The present invention relates to a method of forming multilayer composite thermoplastic panels with a glossy finish using roller forming.

Roller forming as described in copending application Ser. No. 843,343, is a viable process for solid phase forming of thermoplastic sheet into large deformed panel shapes which could be used for automotive exterior body applications or building panels. Monolithic, that is, unreinforced, thermoplastic sheets which originally had a glossy surface finish can be formed into a panel type part with the same glossy finish as the original sheet. However when attempting to apply the same forming process to compos ite sheets, that is, glass fiber reinforced thermoplastic sheets, problems arise. The problems do not involve the actual forming of the composite sheet but rather that the final surface finish on the composite sheet is not glossy, even when the original composite sheet had a relatively glossy surface finish.

The reason for this degradation in surface finish when composite sheets are used, can be observed when the sheet is being heated prior to forming. The composite sheet, due to its method of fabrication, contains a considerable amount of trapped air beneath the surface. Upon heating, the trapped air bubbles rise to the surface and pockmark the surface. In addition, as the sheet surface softens during heating, the glass fibers which are usually constrained by the polymer matrix are free to poke through the surface. Thus, the surface finish is damaged simply by heating the sheet, and if anything, roller forming slightly improves the final surface finish. The composite panel could be finished by coating the panel with a glossy layer or paint. However, this would involve at least one additional finishing step.

It is an object of the present invention to provide a method of forming composite thermoplastic panels with a high quality glossy surface finish without adding any additional finishing steps.

SUMMARY OF THE INVENTION

In one aspect of the present invention a method of forming multilayer composite thermoplastic panels is provided. The method comprises the steps of overlying a reinforced thermoplastic sheet on a monolithic thermoplastic and heating the two sheets to forming temperature, with the reinforced sheet stacked on top of the monolithic thermoplastic sheet. The two sheets are then placed on a form having a predetermined curvature. A roller is used to exert a normal force on the two sheets bending the two sheets to the desired shape and simultaneously laminating the two sheets together.

BRIEF DESCRIPTION OF THE DRAWING

While the specification concludes with claims particularly pointing out and distinctly claiming the present invention, the objects and advantages can be more readily ascertained from th following description of a preferred embodiment when read in conjunction with the accompanying drawing in which FIG. 1 is an isometric view of a roller forming apparatus used in carrying out the method of the present invention; and FIG. 2 is a partial side view of FIG. 1.

DETAILED DESCRIPTION OF THE INVENTION

A glass fiber reinforced thermoplastic sheet is overlayed on a monolithic sheet and the two sheets are heated together in an oven. A radio-frequency oven is preferably used to bring the two sheets to forming temperature within a matter of seconds, beneficially raising the temperature of the inner portions of the material more than the outer portion due to cooling of the exposed outer surfaces. The outer surface of the monolithic sheet is not heated above its resin melting point. This preserves the quality of the finish and avoids introducing any undesired surface variations. It is desirable to heat the composite sheet to a higher temperature than the monolithic sheet. This can be accomplished by heating the composite sheet first before heating the two sheets together, if the radio frequency absorption characteristics of the two materials are similar. If the radio frequency absorption characteristics are different, the length of time each sheet is heated is adjusted to heat the composite sheet to a higher temperature. The inner portions of the two sheets are raised above the glass transition temperature. The composite sheet is placed on top of the monolithic sheet so that the entrapped air is free to escape up from the composite sheet during heating. Once the dssired forming temperature is reached, the two sheets are removed from the oven. The desired forming temperature is one at which the contact interface becomes tacky.

Referring now to FIGS. 1 and 2, apparatus for carrying out the solid phase forming and laminating step is shown. The heated monolithic and composite plastic sheets 5 and 7, respectively, are placed on a metal form 11. The metal form has a heated surface of predetermined curvature with the heated surface reducing heat loss from the composite sheet. The sheets, with either the monolithic or composite layer on top, are held in position on one end of the form by a clamping mechanism 13 that can be hydraulically operated. A normal force is applied to the sheets through a roller 15 which rolls in a direction away from the clamp. The roller can be heated but not above the resin melting point of the sheets. The form and roller can be coated with a friction reducing coating such as PTFE to reduce sticking and friction. The roller 15 can be fabricated of metal for geometries with uniform curvature in the direction of roller movement. A pliable roller can alternatively be used, which can comprise a hard rubber roller with a metal core. A pliable roller which is shown in the Figures, can accommodate more varied mold geometries. During the forming operation, the roller bends the plastic sheet to the desired panel shape while at the same time laminating the two sheets to one another by applying adequate vertical pressure through the roller. The vertical pressure causes the tacky interface between the sheets to bond. The surface finish of the bonded monolithic plastic layer is of the same quality as the original sheet stock before lamination and forming allowing composite sheets with glossy surface finishes to be achieved.

Monolithic and composite sheets have been roller formed and laminated together using a multilayer composite comprising glass reinforced LEXAN polycarbonate resin providing load bearing strength and a layer of high gloss monolithic LEXAN polycarbonate resin sheet. Laminated composite sheets haVe been formed using XENOY polycarbonate and PBT blend high gloss monolithic sheet and glass reinforced XENOX polycarbonate and PBT blend. XENOX and LEXAN are trademarks of the General Electric Company. Sheets of the two materials have also been laminated and formed to one another. The sheets were heated to 350°-450° F. and a pressure of approximately 60-100 psi was applied through the roller. The composite sheets contained 40% chopped glass fiber. The monolithic sheets had a thickness of 0.06 inch and the composite sheets a 0.1 inch thickness. The bonded face between the two plastic sheets was of very high quality and no visible voids or delaminations were present.

A 0.1 inch thermoplastic composite sheet can also be joined to a monolithic sheet 0.01 to 0.02 inches to provide a glossy finish.

If a multilayer composite with more than two layers is desired, additional layers can be heated together and then formed and laminated simultaneously by roller forming. Layers on either side of the composite layer can be used to achieve a symmetric design which could be helpful. in minimizing warpage. When monolithic layers are symmetrically overlayed on both sides of the composite layer. the surface on which the glossy surface is desired is placed on the bottom during heating so that entrapped air will not damage the bottom exterior surface. As previously described, the inner composite layer is heated to a higher temperature than the monolithic layer which will provide the glossy finish surface.

The monolithic sheet can also serve as a protective layer in structural panels for improving scratch resistance, improving appearance or reducing chemical permeability.

The foregoing has described a method of forming composite thermoplastic sheet and at the same time impart a high quality specular surface finish to the sheet.

It is understood that the foregoing detailed description is given merely by way of illustration and many modifications can be made therein without departing from the spirit or scope of the present invention.

What is claimed is:

1. A method of forming a multilayer composite thermoplastic panel comprising the steps of:
   overlaying a reinforced thermoplastic sheet on a monolithic theremoplastic sheet;
   heating the two sheets to forming temperature with the reinforced sheet stacked on top of the monolithic thermoplastic sheet;
   plaacing the two sheets on a form having a predetermined curvature; and
   exerting a normal force using a roller which extends axially across the width of the two sheets and is rolled sequentially across the length of the sheets, thereby bending the two sheets to the desired shape and simultaneously laminating the two sheets together.

2. The method of claim 1 wherein said monolithic thermoplastic sheet has a specular finish.

3. The method of claim 2 wherein said reinforced sheet is heated to a higher temperature than the monolithic sheet.

4. The method of claim 3 wherein specular surface finish of said monolithic thermoplastic sheet is not heated above its melting point.

5. The method of claim 1 wherein said step of heating the two sheets is accomplished in a radio frequency oven.

6. A method of forming a multilayer composite thermoplastic panel comprising the steps of:
   symmetrically overlaying monolithic thermoplastic sheets on a reinforced thermoplastic sheet;
   heating the sheets to forming temperature with the reinforced sheet heated to a higher temperature than the monolithic thermoplastic sheet;
   placing the sheets on a form having a predetermined curvature; and
   exerting a normal force using a roller which extends axially across the width of the sheets and is rolled sequentially across the length of the sheets, thereby bending the sheets to the desired shape and simultaneously laminating the sheets together.

7. The method of claim 1 wherein said step of heating the sheets is accomplished in a radio frequency oven.

8. A method of forming a multilayer composite thermoplastic panel comrpsing the steps of:
   symmetrically overlaying monolithic thermplastic sheets on either side of a reinforced thermoplastic sheet, at least one of said monolithic sheets having an exposed surface with a specular finish;
   heating the sheets to forming a temperature with the reinforced sheet heated to a higher temperature than the monolithic thermoplastic sheets, the sepcular surface of the monolithic sheet not heated above its melting point;
   placing the sheets on a form having a predetermined curvature; and
   exerting a normal force using a roller which extends axially across the width and is rolled sequentially across the length of the sheets thereby bending the sheets to the desired shaped and simultaneously laminating the sheets together.

9. The method of claim 1 wherein said step of heating the sheets is accomplished in a radio frequency oven.

* * * * *